Figure 1:
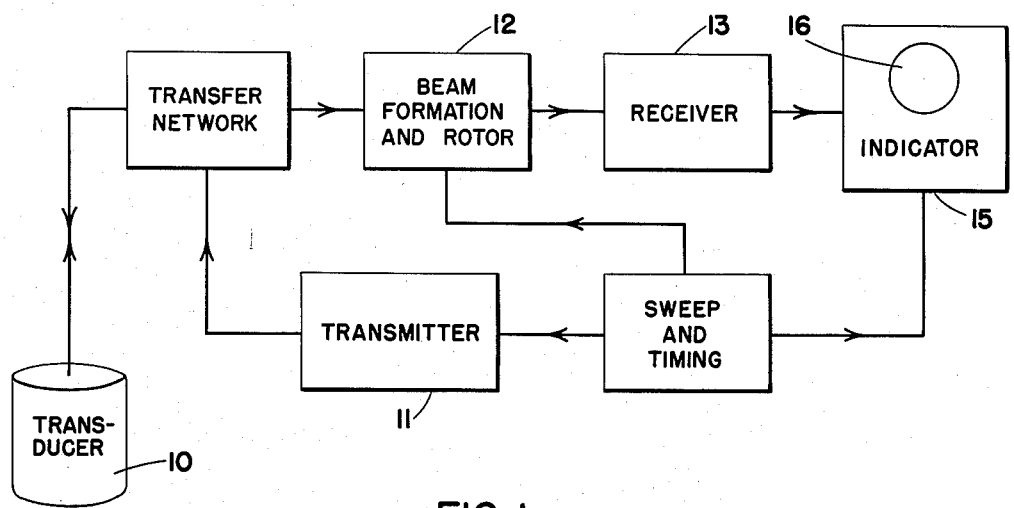

Jan. 3, 1956   N. B. SAUNDERS   2,729,765
RANGE INDICATOR FOR SCANNING ECHO RANGING SYSTEMS
Filed Jan. 8, 1946   3 Sheets-Sheet 1

Inventor
NORMAN B. SAUNDERS

By

Attorney

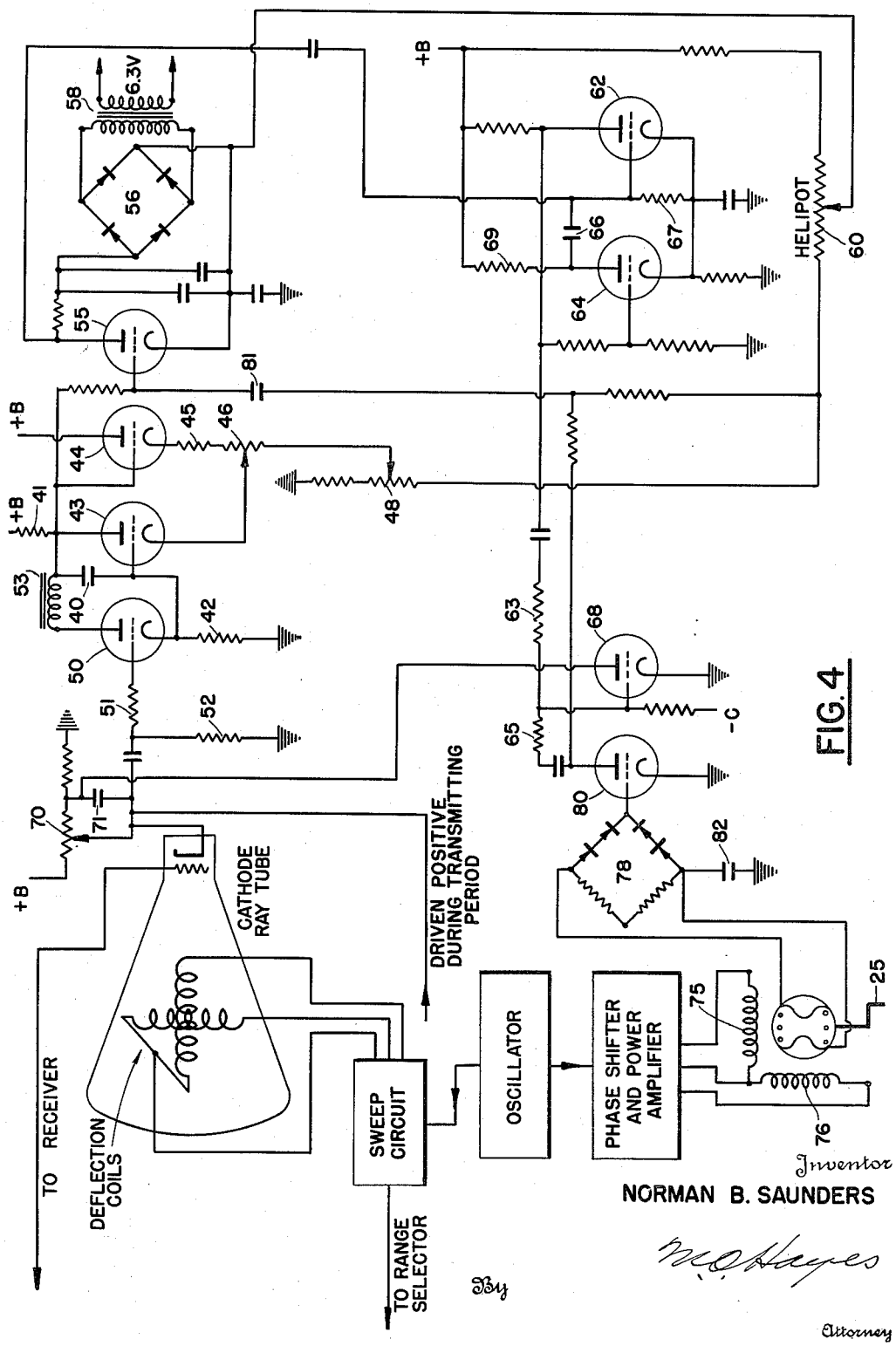

United States Patent Office 2,729,765
Patented Jan. 3, 1956

2,729,765

RANGE INDICATOR FOR SCANNING ECHO RANGING SYSTEMS

Norman B. Saunders, Cambridge, Mass., assignor to the United States of America as represented by the Secretary of the Navy Application January 8, 1946, Serial No. 639,898

13 Claims. (Cl. 315—22)

This invention relates to an indicator for echo ranging apparatus and is particularly directed to means to indicate target-range as derived from a scanning underwater sound system.

It has heretofore been proposed to provide an underwater sound echo ranging system in which the target presentation is by means of a cathode ray tube on which the bearing of the target is given by the angular position of a light spot on the screen of the tube, and the range of the target is given by the radial disposition of the spot. This has been accomplished by impressing an expanding potential on a rotating, normally invisible beam to produce a spiral beam sweep within the tube which beam is brightened by an echo or other received signal. The "plan-position indicator" thus provided is subject to easy interpretation for bearing information since a cursor which may be moved to bracket an echo spot may be continued beyond the periphery of the tube to be read in connection with a suitably graduated bearing scale.

It has been the practice to make provision for a plurality of range scales for echo ranging equipment which require that the pulse interval, or the interval between successive transmissions be varied. For example, the equipment may be so arranged as to cover 3000 yards, 1500 yards or 500 yards at each pulse, in which event the pulse interval is so timed as to permit an echo to return from the stated distances prior to the next pulse. In using the PPI display, the spiral sweep which starts at the center of the display CR tube at the moment of transmission must be expanded at such a rate that it will reach the edge of the tube at a time corresponding to a target distance of 3000 yards, 1500 yards or 500 yards. Since, as above stated, the target range is proportional to the radial displacement of the spot caused by the target echo, it will be seen that a differently graduated scale must be used for each of the selected maximum distances.

The present invention provides a means whereby a single range scale may be used for all of the selected pulse intervals.

It is the primary object of the present invention to provide a highly legible display of range information in the simplest possible manner from the standpoint of the operator.

Another object of the invention is to provide a range indicator in which the range of presentation is in the form of a brightened ring on the face of a cathode ray indicator tube, the position of which is read from a range dial, said ring being incomplete in the region of an echo spot so as not to interfere with the display of the desired echo.

Another object of the invention is to provide an electronic range marking circuit in which a range gate is tripped by a sharp voltage pulse which is unaffected by and which does not affect the rest of the electronic receiving and indicating equipment.

Figure 3:
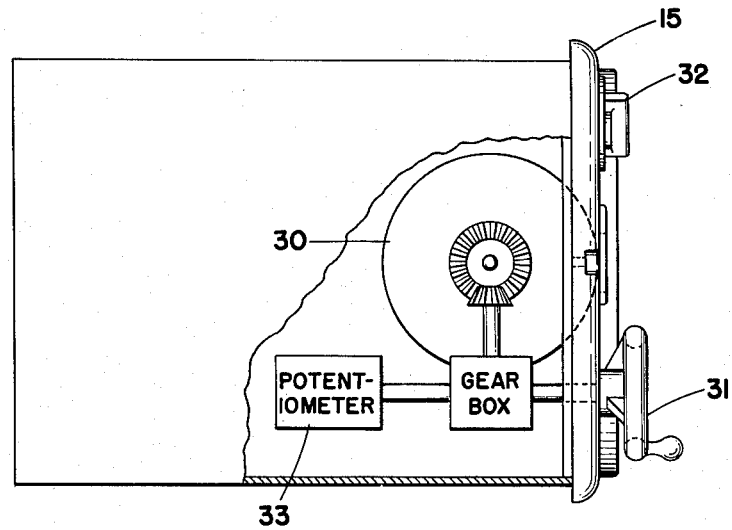
Figure 2:
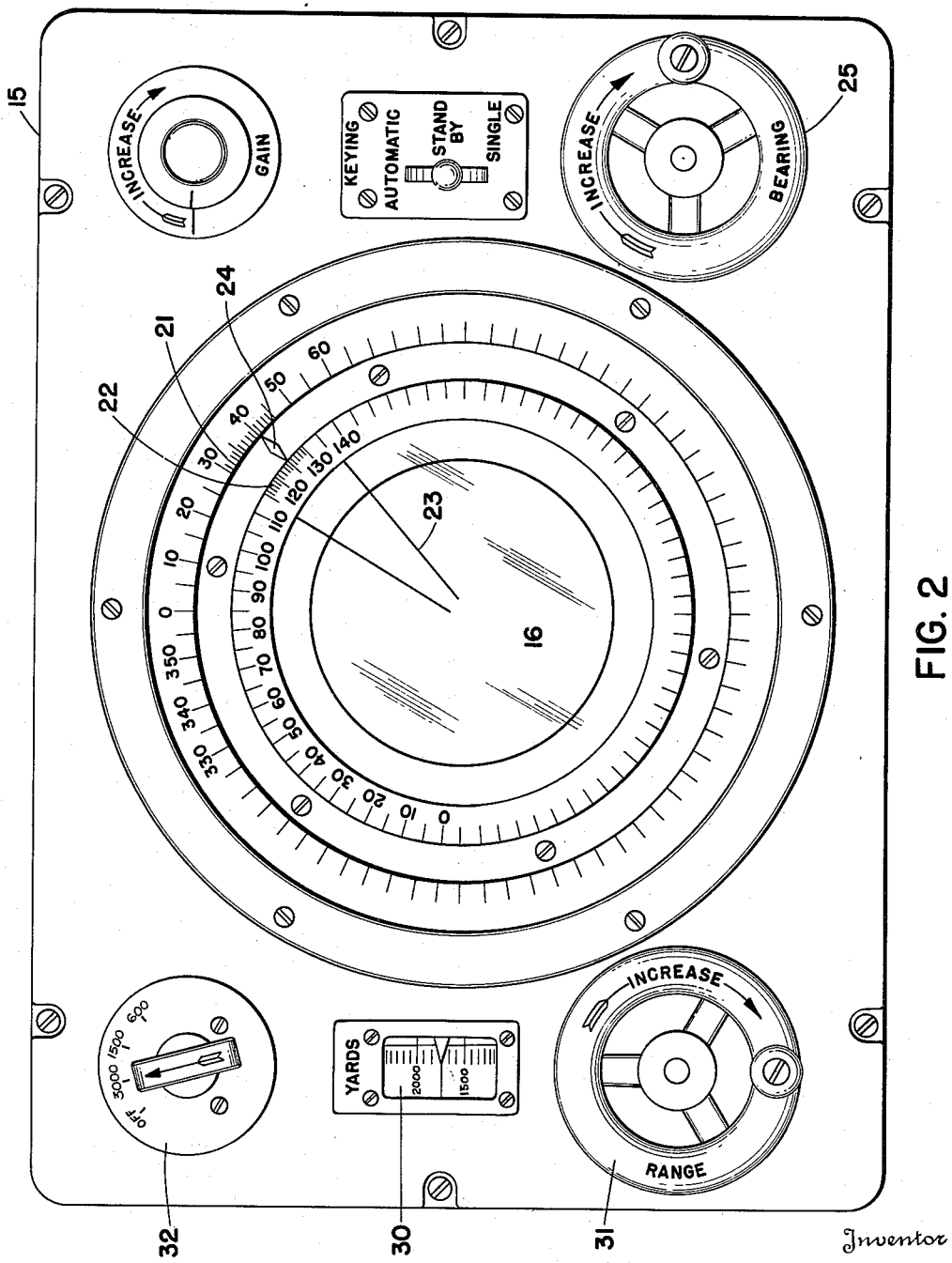

Other objects and advantages of the invention will become apparent from the following description, reference being had to the accompanying drawings in which:

Figure 1 is a block diagram of an echo ranging system; Figure 2 is a front elevation of an indicator embodying the present invention; Figure 3 is a side view of the indicator; and Figure 4 is a schematic diagram of that portion of the indicator circuit which embodies the electronic improvements of the present invention.

Referring to the drawings, there is shown in Figure 1 a block diagram of the essentials of an echo ranging system. As there indicated, the system includes an energy transducer 10 which is capable of converting electrical energy into energy of a form suitable for propagation in the medium. In the system to which the invention has been adapted at this time the propagated energy is supersonic compressional wave energy, although the invention can be adapted to other forms of wave energy systems with minor modifications.

The transducer 10 is energized periodically by a transmitter 11 to emit a pulse of sound into the water, an echo of which serves to generate electrical impulses in the transducer elements which impulses are taken to a scanning rotor 12 and receiver 13. The scanning rotor will be used in those systems in which the transmitted pulse is intended to cover all or a substantial part of the underwater horizon. Systems of this type are described in the copending applications of O. Hugo Schuck, Ser. No. 536,172, filed May 18, 1944, issued as Patent No. 2,473,974, on June 21, 1949; O. Hugo Schuck et al., Ser. No. 549,460, filed August 14, 1944, issued as Patent No. 2,697,822, on December 21, 1954; and Stanley R. Rich, Ser. No. 563,042, filed November 11, 1944, issued as Patent No. 2,703,396, on March 1, 1955. The receiver 13 may be of any desired type which is capable of amplifying and preparing for presentation a signal appearing at the transducer 10.

An indicator 15 is fed by receiver 13 and presents the output of the receiver on the screen of a cathode ray tube 16 mounted in the indicator housing. The beam of the cathode ray tube is swept spirally outward with each transmission, the rate of rotation of the beam corresponding to the scanning rate, and the rate of expansion of the spiral corresponding to the increase in range, so that a measurement of the distance between the center of the tube and an echo spot will give the range of the object from which the echo has originated. As above stated, this can be done by laying a suitably graduated scale over the face of the tube, or it can be done by making an indication on the tube at the same distance from the center as the echo spot and controlling the means for making the indication by means of a calibrated dial. The present invention relates to the latter range marking system.

The indicator box to which the present invention has been applied is shown in Figures 2 and 3. As shown in Figure 2, the screen of a cathode ray tube is surrounded by true and relative bearing dials 21 and 22. A cursor plate 23 having scribed radii spaced to include an echo spot overlies the face of the tube and cooperates with the bearing dials to give an easily readable indication of both true and relative bearing. The exactness of the indication is obtained by means of a bug 24 carried between the bearings rings and so disposed that the center of an echo spot bracketed by the scribed lines of the cursor will be indicated by the bug. The cursor 23 and bug 24 are positioned manually by means of a hand-wheel 25 through the medium of a suitable driving connection not shown. A synchro rotor is likewise driven by the handwheel 25 at the same speed as the cursor 23 so that the position of the cursor is reflected in the position of the synchro rotor.

The indicator range is read from a range dial 30 which is turned by a handwheel 31. In practice the handwheel is turned until the range mark on the CRO face is at the same range as the echo spot and the range distance in yards is read from dial 30. Immediately above the range dial 30 is a range selector switch 32 which, by means which need not be described here, determines the transmitter pulse interval and, of course, at the same time the rate of expansion of the spiral sweep of the CRO.

A multiple turn, carefully graduated potentiometer 33 commercially designated a "Helipot" is driven by the shaft of the handwheel 31 so that the position of its slider is changed directly in accordance with the setting of the range dial 30.

The present invention contemplates marking a bright ring on the face of the cathode ray tube, the position of which varies in accordance with the range. This can be done by providing a linearly increasing voltage which increases substantially in accordance with the range of the echo spot. For example, if the device is operating on the 1500 yard range setting, zero range is at the center of the screen face and 1500 yards represents the fully expanded sweep at the edge of the screen face. An echo spot occuring at two-thirds of the distance of the center and outside of the screen face would represent an echo received from a reflecting object 1000 yards distant from the transmitter. It is apparent therefore that the range mark may be placed on the face of the tube by a circuit which is adjusted or gated by the Helipot and which is tripped by a linearly expanding voltage. The present invention accomplishes this by providing a circuit which charges a capacitor linearly with time, which capacitor is discharged to repeat its charging cycle each time the transmitter is keyed.

Referring to the schematic, Figure 4, the capacitor to be charged is designated 40. The capacitor is charged from the positive supply through a resistor 41 and has resistor 42 in its ground circuit. A parallel, controlling path is provided by means of triode 43 and associated controlled triode 44. It is apparent that if the point of connection of the grid of triode 43 to the capacitor circuit can be kept at a constant potential with respect to ground the charge into the capacitor 40 will increase linearly. The potential at this point is maintained by the circuit which includes triodes 43 and 44 so connected that the plate of triode 43 controls the bias on the triode 44 which, in effect, is the cathode follower amplifier with its cathode connected back through bleeders 45 and 46 to the cathode of triode 43. The rate of expansion of the sweep is controlled by placing the original bias on the cathode of tube 43 by means of a bias potentiometer 48. It will be seen that during the charging of capacitor 40 the potential on the plate of triode 43 rises, causing the potential of the grid of triode 44 to rise, raising the cathode potential of triode 44 which, in turn, raises the potential of the cathode of triode 43 so that both the plate and cathode of triode 43 rise together although their rate of rise is somewhat different while the potential of the grid remains constant. The linearity of the circuit may be adjusted by making the cathode bleeder 46 adjustable.

The capacitor 40 is discharged at each transmission by shorting its plates through a resetting triode 50 the grid of which receives a positive pulse whenever the transmitter is keyed. The grid being normally connected to ground through resistors 51 and 52 the triode 50 is normally cut off. If desired, a choke 53 may be inserted in the plate circuit of triode 50 for the purpose not only of discharging the capacitor 40 quickly but, by its electrical inertia, carrying the capacitor somewhat beyond zero potential and imposing an opposite charge on its plates.

The linear increasing voltage at the plate of capacitor 40 is impressed on the grid of a range gate triode 55. The plate and cathode of the range gate are connected to opposite points of a rectifier 56 so that a rectified AC voltage from a transformer 58 is impressed on both the plate and cathode of this tube. The rectifier 56 assures about an 8 volt difference between the plate and cathode. The potential of the cathode referred to ground is further controlled by the Helipot, which is designated 60, the slider of which is connected to the cathode side of the rectifier, and to the cathode of the range gate tube 55. The Helipot 60 therefore establishes a definite threshold of operation so that whenever the grid of tube 55 reaches the threshold which is perhaps 1 volt below that of the cathode, tube 55 will conduct. The linear approach to this threshold is made by the voltage from sweep tubes 43, 44, but the actual tripping operation of the range gate tube 55 is caused by a rectified pulse as hereinafter described.

It is, of course, desirable that only a single bright ring be placed on the face of the cathode ray tube so that the conducting state of tube 55 which lasts for perhaps a fraction of a second must be converted into a single pulse which endures for at least one rotation of the sweep and preferably very little longer. If the sweep frequency is 300 cycles per second the pulse must be at least 1/300 second long and not more than 1/200 second long. This can be accomplished by providing a pulsing circuit in the form of a slow recovery flipflop triode pair, 62, 64. Triode 62 normally conducts and triode 64 is normally biased off by reason of its cathode and grid connections to the conducting tube. Instead of connecting the plate of the biased tube to the grid of the conducting tube in the manner usual in flipflop circuits, the present invention provides in this path a capacitor having different charging and discharging time constants. Consequently when tube 62 is biased off by a voltage from tube 55 the increase in potential of its plate is reflected in the grid of tube 64 and the latter tube conducts so that capacitor 66 is discharged through the conducting tube and a relatively small resistor 67. The time constant of this path determines the duration of the pulse output. The return of the circuit to its original condition cannot take place until capacitor 66 is recharged to about .7 of its fully charged state, and the recharging must take place from the B+ supply through a large resistor 69 so that the charging time constant is long enough to exceed the period during which the output of tube 55 is of a value great enough to trip tube 62. This latter period during which retripping might take place is of the order of 30 to 50 milliseconds.

The output of the pulsing circuit including tubes 62 and 64 is taken through a resistor or mixing network including resistors 63 and 65 to the grid of an isolating amplifier 68 which is normally cut off. The pulse amplitude is sufficient to bias this tube to conductivity and thus provides a path to ground for the cathode of the cathode ray tube which is connected to the plate of tube 68 through a potentiometer 70 and for a purpose which will presently become apparent to a parallel capacitor 71. Thus, when the tube 68 conducts, the cathode potential is so reduced that a bright ring appears on the face of the cathode ray tube.

If the range marking ring thus placed on the scope face were to be continuous in the region of the echo spot, the echo would be blotted out and the entire purpose of the device defeated. It is, therefore, essential that the bright ring be interrupted in the vicinity of the echo. The present invention provides a means whereby this discontinuity comes between the scribed lines on the cursor 23 and the controlling circuit has been designated a "bearing gate."

As previously stated the handwheel that positions the cursor also moves the rotor of a two phase position transmitter at the same rate so that the position of the cursor is reflected in the position of the rotor. As diagrammatically indicated on the schematic the synchro stator includes two windings 75 and 76, 90° in space quadrature each of which is separately energized from one phase of a suitable two phase power amplifier to set up between them a rotating magnetic field which links the rotor. The phase of the voltage induced in the rotor is thus dependent on its angular position in the field and so on the position of the cursor 23. The induced rotor voltage is rectified in an unbalanced full wave rectifier 78 and applied to the grid of bearing gate tube 80.

The rectifier 78 would normally produce a symmetrical output wave at twice the input frequency, but this wave form can be changed to provide peaks occurring at the input frequency by shifting the phase of one half of the input wave. This phase shift and hence the unbalanced output wave form is most advantageously accomplished by a capacitor 82 inserted between one leg of the rectifier and ground so that the current normally flowing through this leg of the rectifier will be shifted in phase by an amount depending on the value of the capacitor.

The average value of the rectifier output is sufficient to bias tube 80 to cut off, but the higher cusps of the unsymmetrical wave make the grid sufficiently less negative that the tube will conduct. The period of conductivity occurs once for each cycle of the voltage induced in the synchro rotor and if this voltage is derived from the oscillator which drives the CRO spiral sweep it will occur once during each rotation of the spiral. The duration of the period can be adjusted by varying the initial bias of the tube and the relation of this bias of the unsymmetrical wave from the rectifier. It is thus a matter of adjustment to provide for a conductive period of bearing gate tube 80 which is 25° or 30° or any selected value in each rotation.

The output of bearing gate tube 80 is fed to the resistive mixer network 63, 65 and hence to the grid of the isolation amplifier 68 and is of sufficient level to cut this tube off whenever tube 80 conducts. Thus in spite of the fact that tube 68 may be conducting and thus lowering the cathode ray tube cathode potential the conductivity is interrupted briefly and the cathode potential restored whenever the bearing gate tube impresses its overriding output on the grid of tube 68.

In order that the discontinuity be sharply defined, parallel capacitor 71 is inserted in the circuit to add a small voltage across the terminals of the brightening adjustment potentiometer by reason of its retained charge gathered during the pulse and which manifests itself when the potential of the lower end of the potentiometer is restored after conduction of tube 68. The action of the capacitor 71 cleans up the CRO brightened ring and prevents a gradually reduced, fuzzy trace.

The pulse output of bearing gate tube 80 is also impressed on the grid of the range tube 55 to add to the linearly increasing bias from tube 43. Thus the range gate tube is tripped at a point in the cycle of rotation of the spiral sweep which is closely associated with the position of the bearing cursor so that the bright ring starts in this vicinity rather than at some remote point. The sharpness of the bearing gate pulse may be increased if desired by differentiating it in a capacitor 81, and may serve to increase greatly the accuracy with which the pulsing tube 62 is tripped. By reason of the superposed alternating voltage on the grid of tube 55 which is amplified in this tube, the output becomes a series of pulses of increasing magnitude, increasing at a rate such that the tripping level of the "flip-flop" circuit is approached at a relatively rapid rate. Once the full conductivity of tube 55 is attained, the only output is a clipped series of small, unchanging pulses from the bearing gate circuit, insufficient to re-trip tube 62 until the device has been reset. In the interval between the initial tripping and full conductivity the re-tripping is prevented by the fact that capacitor 66 has not yet recharged through resistor 69.

In operation, the system is adjusted in range by handwheel 31 which, in turn, adjusts the Helipot 33 thus determining the bias necessary to cause range gate tube 55 to conduct. The bearing gate or blanking of the range ring is adjusted by handwheel 25 which moves the rotor of the position transmitter to fix the phase of the voltage to be rectified and impressed on tube 80. The remainder of the operation, that of the specific circuit elements, has been set forth in the description thereof.

While the invention has been shown and described in connection with a specific form and disposition of the circuit elements, various modifications therein will suggest themselves to those skilled in the art. It should be expressly understood that such modifications and changes may be made without departing from the spirit of the invention as defined in the appended claims.

What is claimed is:

1. Apparatus for supplying an electrical impulse to a cathode ray tube having imposed thereon a spiral sweep which includes, range gate means including an electronic valve controlled by a linearly varying voltage at each initiation of said spiral sweep, said gate means initiating said impulse, a pulsing circuit operated by said range gate and having incorporated therein a capacitor for determining the duration of said impulse, means to impress the output of said pulsing circuit on said cathode ray tube, and means operative in a predetermined sector of the spiral of said spiral sweep, said means providing a transient signal to override the output of said pulsing circuit whereby the impulse supplied to the cathode ray tube is interrupted, said overriding means including a triode, and a full wave rectifier connected to said triode, means to supply a voltage of an adjustable phase to said rectifier, and a capacitor connected to unbalance said rectifier whereby the output thereof which is impressed on said triode consists of a voltage wave having peaks at the impressed frequency.

2. In a spirally-scanned cathode ray tube control circuit including a positively biased cathode therein for brightening a segment of the scanning spiral of diameter proportional to time after initiation of a scanning spiral, a condenser connected for linear charging thereof between a voltage supply and ground potential and separated from said supply and ground by a pair of resistances, a triode connected with its grid and plate at the potentials of the two plates of the condenser, respectively, and its cathode resistively connected to ground, a second triode having the plate thereof connected to said voltage supply and the grid thereof at the plate potential of first said triode, the cathode thereof being connected through a resistance to the cathode of first said triode, whereby the first triode plate and both triode cathodes rise in potential as the condenser charges while the first triode grid maintains a steady reference potential on the lower condenser plate, condenser discharging means including a triode in parallel with the condenser and having a grid operating circuit responsive to a positive pulse on the cathode of said cathode ray tube, a discharge circuit connected for operation at a predetermined charge on the condenser, and means connecting said discharge circuit to the cathode of the cathode ray tube, whereby the cathode ray spot is brightened when said discharge circuit operates.

3. The control circuit of claim 2 including a range gating device including a triode having the grid thereof coupled to the plate of the first said triode and the plate thereof operatively connected to a timing circuit, a timing circuit triggered by said device and operative to control the duration of operation of said discharge circuit.

4. The circuit of claim 3 including electronic means interrupting said discharge for a predetermined portion of each brightened loop of spiral sweep.

5. The circuit of claim 4 and manually controlled means for varying the rotational position of said interrupted portion of brightened spot, whereby the unbrightened portion of a brightened spiral segment is rotationally adjusted.

6. In an indicating system having a spirally-scanned cathode ray tube control circuit including a positively biased cathode therein responsive to an impulse for brightening a segment of the scanning spiral, means including a linearity circuit and a first gating means for forming and controlling the initiation of said impulse, electronic means connected to said first named means for determining the duration of said impulse, and means comprising a phase-shifting means, a second gating means, and a tube-isolating means, connected between said electronic means and said cathode for interrupting said impulse for a predetermined amount of time.

7. An indicating system as in claim 6 including a resistance-capacitance circuit means interposed between said means interrupting said impulse and said cathode for producing a clearly defined indication of said interruption.

8. An apparatus for supplying an electrical impulse to an element of a tube for controlling electron flow therein which includes, a pulsing circuit connected to said element, a first means connected to said pulsing circuit to establish a regularly repeated initiation of an impulse from said pulsing circuit, said first means including a normally non-conducting triode and a linearity circuit connected to said triode, means to so bias said triode that a conducting state is approached and passed linearly with time, means to supply pulses to said triode to be amplified therein and utilized for impulse initiation while the bias on said triode is increasing so that the amplification of said pulses is first insufficient, then sufficient and later again insufficient to initiate an impulse, a second electronic means determining the duration of said impulse, and a third means to interrupt said impulse after an adjustably determined interval within said impulse and for a determined part of its duration.

9. An apparatus for supplying an electrical impulse to an element of a tube for controlling electron flow therein which includes, a pulsing circuit connected to said element, a first means including a linearity circuit connected to said pulsing circuit to establish a regularly repeated initiation of an impulse from said pulsing circuit, a second electronic means determining the duration of said impulse, said second means including a resistor-capacitor circuit having a discharge time constant substantially equal to the impulse time, and a recharging circuit for said capacitor the time constant of which greatly exceeds the discharge time constant whereby a second discharge of said capacitor is delayed, and a third means to interrupt said impulse after an adjustably determined interval within said impulse and for a determined part of its duration.

10. An apparatus for supplying an electrical impulse to an element of a tube for controlling electron flow therein which includes, a pulsing circuit connected to said element, a first means including a linearity circuit connected to said pulsing circuit to establish a regularly repeated initiation of an impulse from said pulsing circuit, a second electronic means determining the duration of said impulse, and a third means to interrupt said impulse after an adjustably determined interval within said impulse and for a determined part of its duration, said third means including an inductive apparatus, means to adjust the position thereof, means to induce a voltage in said apparatus the phase of which is determined by its adjusted position, means to rectify said induced voltage to produce an unbalanced rectified wave, and means operated by said rectified wave for applying to said interrupting means a phase controlled voltage sufficient to override said impulse during its existence.

11. An apparatus for supplying an electrical impulse to an element of a tube for controlling electron flow therein, said apparatus comprising a linearity circuit, first means coupled to said linearity circuit and adapted to be coupled to a trigger pulse source for initiating each operation of said linearity circuit synchronously with a trigger pulse, an adjustable gating circuit coupled to said linearity circuit, a fixed width impulse generating source coupled to said gating circuit, second means coupled to the output of said fixed width impulse generating source for coupling the output of said fixed width impulse generating source to the element of the tube, third means providing a train of equally spaced voltage peaks at a frequency many times that of the trigger pulses applied to said linearity circuit, said third means being coupled to said second means and adapted to block said second means to interrupt each impulse for a part of its duration, said third means also being coupled to said gating circuit to modulate the input thereto whereby each impulse begins synchronously with the trailing edge of a voltage peak from said third means.

12. An apparatus for supplying an electrical impulse to an element of a tube for controlling electron flow therein, said apparatus comprising a linearity circuit adapted to be coupled to a trigger pulse source for initiating each operation of said linearity circuit, an adjustable gating circuit coupled to said linearity circuit, a fixed width impulse generating source having a minimum impulse repetition rate equal to or greater than the repetition rate of trigger pulses applied to said linearity circuit, said fixed width impulse generating source coupled to said gating circuit, first means coupled to said fixed width impulse generating source for coupling the output thereof to the element of the tube, second means providing a train of equally spaced voltage peaks at a frequency many times that of the trigger pulses applied to said linearity circuit, said second means being coupled to said first means and adapted to block said first means to interrupt each impulse for a part of its duration, said second means also being coupled to said gating circuit to modulate the input thereto whereby each impulse begins synchronously with the trailing edge of a voltage peak from said second means.

13. A range indicator for use with a scanning echo ranging system of the type that includes a cathode ray tube having beam deflection means, a sweep circuit coupled to the deflection means for causing the cathode ray tube beam to be swept spirally outward with each transmission from the system, the rate of expansion of the spiral corresponding to increase in range so that a measurement of the distance between the center of the cathode ray tube and an echo spot will give the range of the object from which the echo originated, an oscillator coupled to the sweep circuit and controlling the rotation of the cathode ray tube beam so that it is synchronous with scanning by the system, and biasing means coupled to the cathode of the cathode ray tube for holding the cathode ray tube beam current at a level below that needed for a visible trace except when an echo pulse is applied to its control grid; said range indicator comprising a linearity circuit adapted to be coupled to the system whereby it initiates a cycle synchronously with each transmission from the system and with the beginning of each spiral sweep; an adjustable range gate circuit coupled to said linearity circuit and adapted to generate an output when the input thereto exceeds an adjustable threshold; impulse generating means for generating equal width impulses whose width corresponds to the period of one rotation of the beam on the cathode ray tube and whose recovery rate is such that it cannot generate more than one impulse during a period corresponding to each complete beam spiral in the cathode ray tube, said impulse generating means being coupled to said range gate circuit and generating an impulse when triggered by the leading edge of an output from said range gate circuit; isolating means for coupling impulses from said impulse generating means to the cathode of the cathode ray tube for overcoming the bias thereon; adjustable means adapted to be coupled to the oscillator for generating a pulsating voltage having peaks occurring at the frequency of the output of the oscillator and whose phase relative to the output of the oscillator is adjustable, said last-mentioned means being coupled to said isolating means to block said isolating means during each voltage peak thereof, said last-mentioned means also being coupled to said range gate circuit to modulate the output of the linearity circuit whereby the leading edge of each impulse from said impulse generating means is always coincident with the trailing edge of a voltage peak from said last-mentioned means.

References Cited in the file of this patent

UNITED STATES PATENTS

| | | |
|---|---|---|
| 1,938,742 | Demarest | Dec. 12, 1933 |
| 2,185,363 | White | Jan. 2, 1940 |
| 2,292,100 | Bliss | Aug. 4, 1942 |
| 2,307,237 | Rea et al. | Jan. 5, 1943 |
| 2,408,415 | Donaldson | Oct. 1, 1946 |
| 2,416,088 | Deerhake | Feb. 18, 1947 |
| 2,590,114 | McVay | Mar. 25, 1952 |

FOREIGN PATENTS

| | | |
|---|---|---|
| 406,903 | Great Britain | Mar. 8, 1934 |